May 19, 1942.　　A. F. TOELKE ET AL　　2,283,885
AUTOMATIC TESTING GAUGE
Filed Feb. 17, 1941　　6 Sheets-Sheet 5
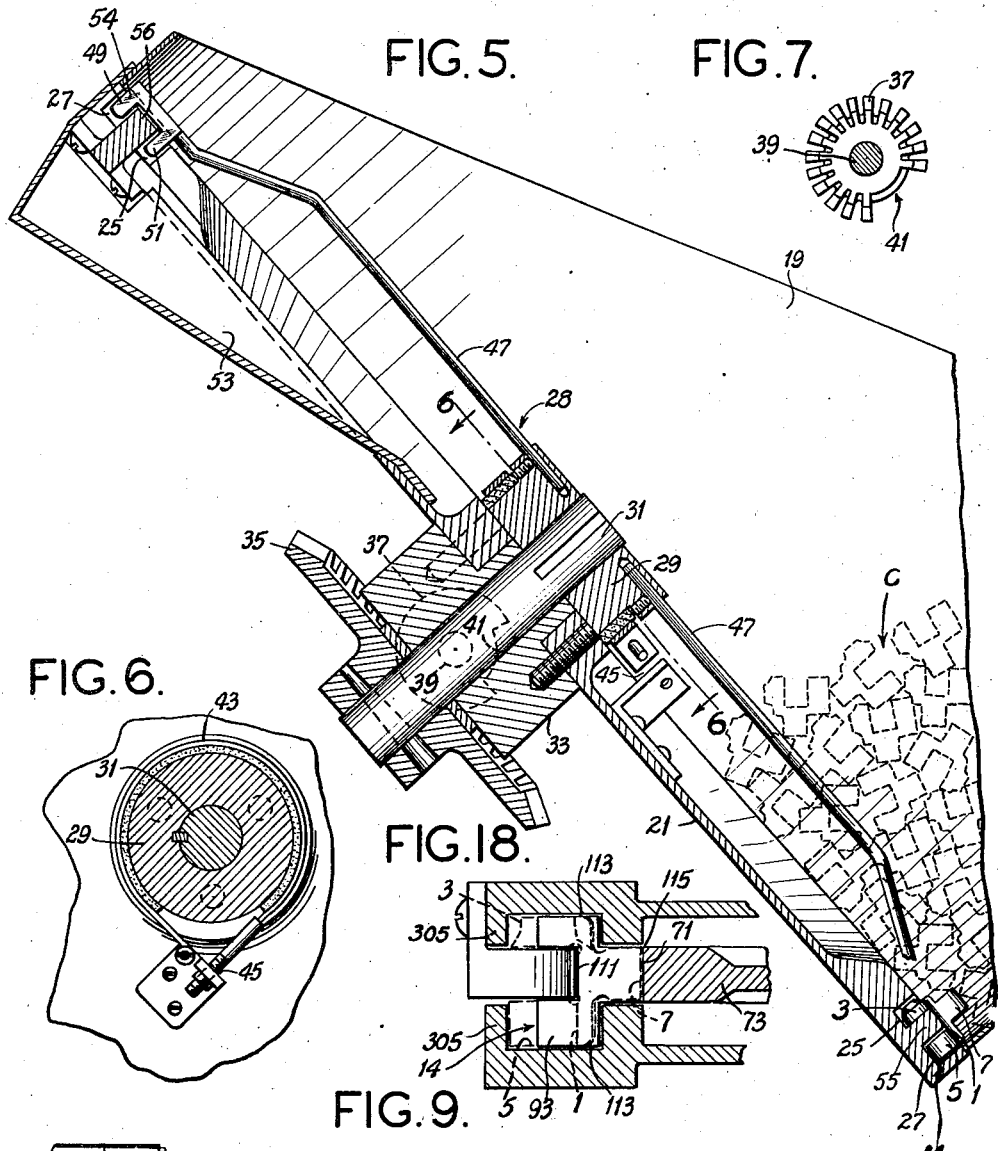
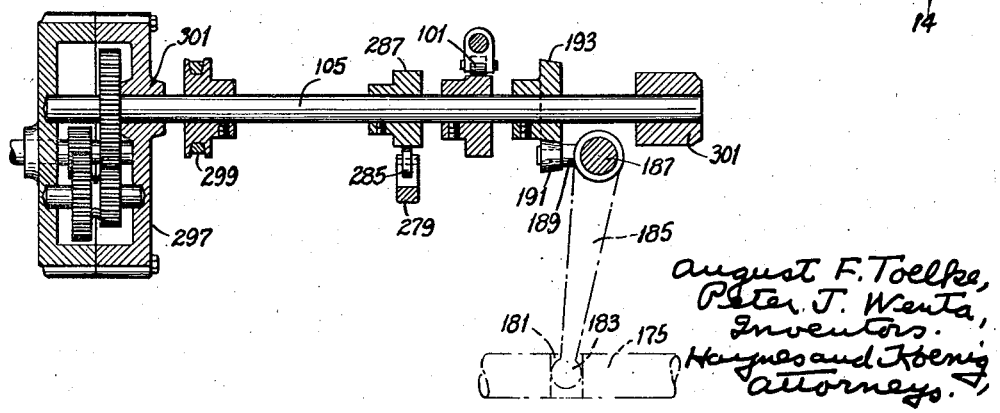

Patented May 19, 1942

2,283,885

UNITED STATES PATENT OFFICE 2,283,885

AUTOMATIC TESTING GAUGE

August F. Toelke, Velda Village, and Peter J. Wenta, Brentwood, Mo., assignors to Jackes-Evans Manufacturing Company, St. Louis, Mo., a corporation of Missouri Application February 17, 1941, Serial No. 379,272

27 Claims.  (Cl. 209—75)

This invention relates to an automatic testing machine, and with regard to certain more specific features to such a machine for gauging certain distances on, and deformability of, cartridge clips and the like.

Among the several objects of the invention may be noted the provision of gauging apparatus which will automatically pick up heterogenously positioned clips from a supply, and first gauge the clips for certain characteristics of shape and then gauge them for deformability; the provision of a device of the class described which is independent of any unreliability due to any human factor of choice; and the provision of a device of this class which accomplishes gauging positively but at a rapid rate, and which substantially reduces the labor cost in making clips, the greater part of which cost heretofore was due to the above-specified gauging requirements. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a plan view of the device;

Fig. 5 is a vertical section taken on line 5—5 of Fig. 1, showing a supply compartment with parts broken away;

Fig. 6 is a bias section taken on line 6—6 of Fig. 5, detailing a brake;

Fig. 7 is a detail section taken substantially on line 7—7 of Fig. 2 and showing an intermittent pinion drive;

Fig. 8 is a bias section taken on line 8—8 of Fig. 3, showing an oscillating gauge block in gauging position;

Fig. 9 is a horizontal section taken on line 9—9 of Fig. 2, showing a driving and cam shaft;

Fig. 16 is a perspective view in solid lines of one of the clips to be tested and in dotted lines a second clip and two cartridges forming part of a longer belt (not shown);

Fig. 17 is a vertical section taken on line 17—17 of Fig. 3; and,

Fig. 18 is a fragmentary section taken on line 18—18 of Fig. 14.

Similar reference characters indicate corresponding parts throughout the several views of the drawings.

The present apparatus has particular reference to testing of cartridge clips. The clips are ultimately held together as a chain by cartridges which act as pintles. The resulting belt formed of the clips and cartridges is fed into machine guns, and the cartridges are sequentially withdrawn from the clips during operation of the gun. In Fig. 16 the solid lines show one of the clips 14, and the dotted lines show a second clip, along with two linking cartridges 6 and 8. When the gun withdraws cartridge 8, the clip 7 falls away.

Figure 14:
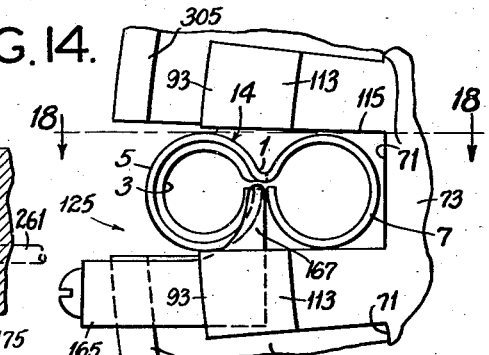
Fig. 14 is an enlarged section taken on line 14—14 of Fig. 2.

Each clip consists of a center rib 1 double-banded at end bands 3 and 5 on one side, and having an intermediate band 7 on the other side. In side elevation the clip has the appearance of a numeral eight, bands 3 and 5 forming one loop in elevation, band 7 forming the other, and rib 1 the waist between loops (Figs. 14 and 16). In successive clips, the end bands 3 and 5 are held axial with the center band 7 by means of cartridges 9. Bands 3 and 5 closely and frictionally grip the cartridge, while band 7 is rotary on the cartridge. Thus it is necessary that the distance between the inner edges 11 of the spaced bands 3 and 5 be within certain limits for smooth and accurate rotary action of the intermediate band 7 of the next clip, and also that the two axes 10 and 12 of the bands 3, 5 (taken together) and 7, respectively, be equally spaced. In order that these axes 10 and 12 may be properly spaced, it is necessary that under endwise pull in the belt there will be no excessive permanent bending at the rib 1 (compare Figs. 14 and 15).

Broadly, in order to test for spacing of the axes 10 and 12, the clip has two fingers 171 and 173 (Figs. 10-13) inserted into the bands 3, 5 (taken together) and 7, respectively, simulating shells, and these fingers are then drawn apart a predetermined distance by a resiliently applied, predetermined force. If the clip takes a permanent set due to the stress in rib 1, it is to be rejected. Otherwise it is passed. Gauging for distance between edges 11 is done by a distance block 127 (Fig. 8).

Figure 1:
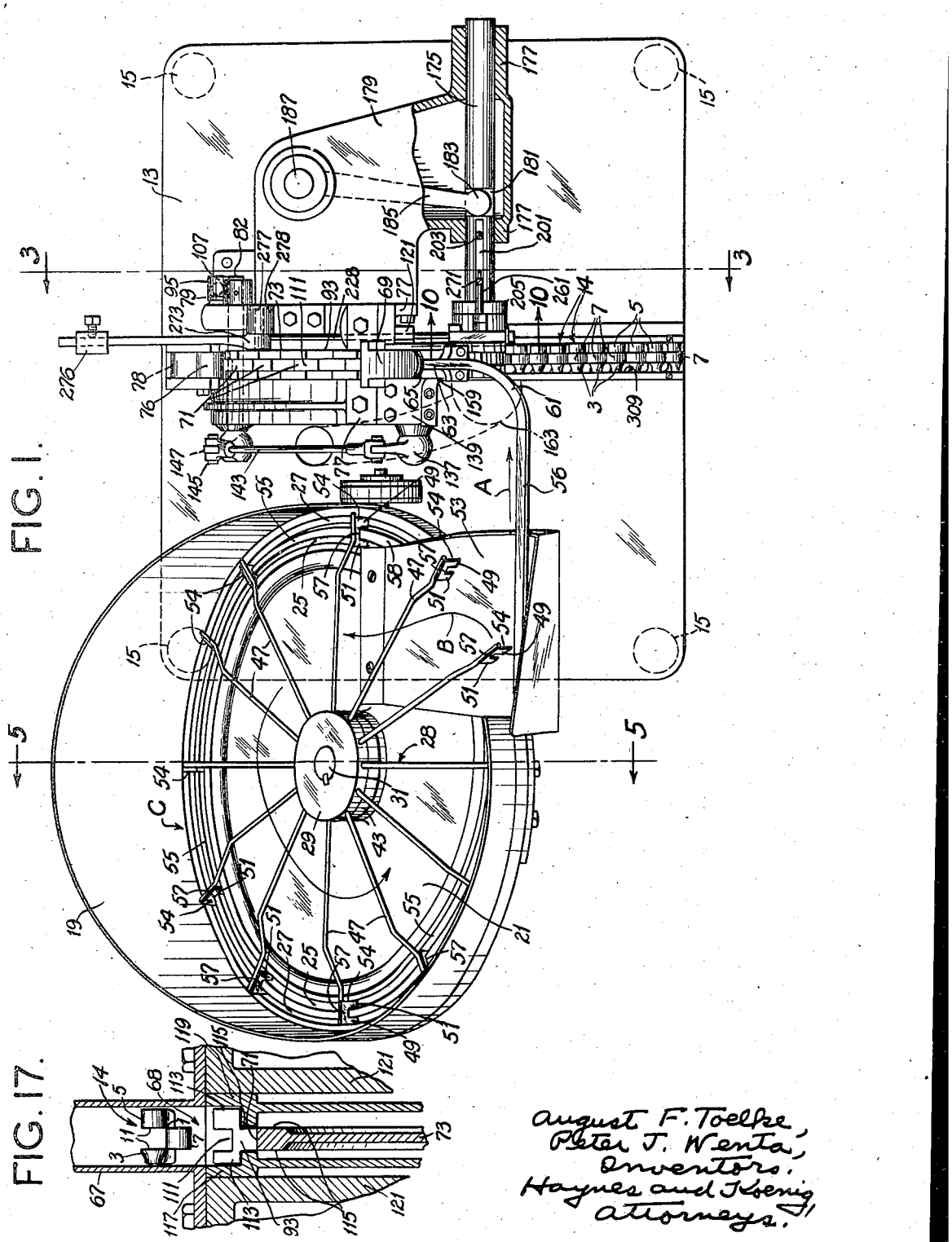
Figure 2:
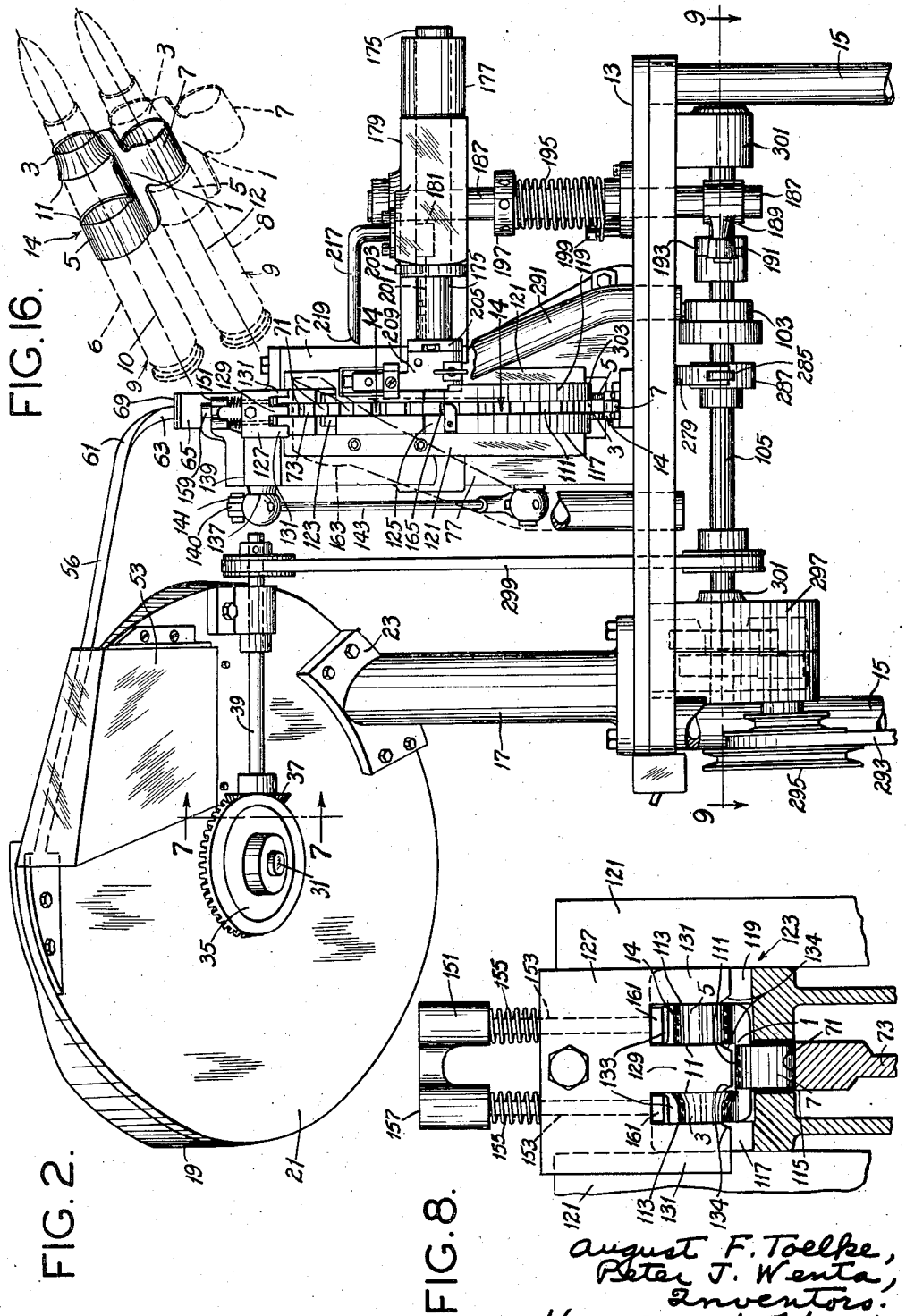
Fig. 2 is a front elevation of Fig. 1.

Referring now more particularly to Figs. 1, 2 and 5, there is shown at 13 a platform supported on legs 15. At one end is a vertical support 17 for a supply drum 19. The drum has a sloping bottom 21, carried on the support 17 by means of a head 23.

Located peripherally at the edge of the bottom 21 are grooves 25 and 27 in which respectively fit the bands 5 and 3 (Fig. 5). Since the band 5 and its corresponding groove 25 are narrower than the band 3 at its corresponding groove 27, it follows that no clip can become located with the band 3 in groove 25 or the band 5 in groove 27. That is to say, the heterogeneously located clips must, if at all, fall into the groove as shown in solid lines at the bottom of Fig. 5.

If a supply C of clips 14 is dropped into the drum 19, they will gravitate to heterogeneous positions in the lower part of the bottom 21 and by chance one or more may assume the position shown in Fig. 5. If moved, more may assume this position. In order that the supply may be stirred to movement so that successive clips may fall into the grooves 25 and 27, as shown in Fig. 5, and in order that clips which so fall into the grooves may be moved therefrom, we provide a rotary spider 28 having a hub 29 which is keyed to a shaft 31, the latter being rotary in a stationary block 33 attached to the stationary bottom 21. At its outer end, the shaft 31 is provided with a bevel gear 35 which is driven from a bevel pinion 37 shown in Fig. 7, carried on a countershaft 39 (Fig. 2). The pinion 37 has some teeth omitted at 41, so that under continuous driving conditions of the pinion, the gear 35 will be intermittently driven.

In order that the stationary positions of the shaft 31 may be definite, a friction brake 43 constantly applies friction to the hub 29, the same being adjustably applied for the purpose, as indicated at 45. Thus, during the interval that the blank space 41 on the pinion 37 does not drive the gear 35, the shaft 31 is held in a fixed position.

Extending from the hub 29 is a plurality of arms 47. On the end of each arm is a rake 54 having fingers 49 and 51 which respectively move around through the grooves 27 and 25. By this means, clips which fall into the position shown at the lower end of Fig. 5 are propelled around the tracks 27 and 25 to the upper side of the drum 19. At the same time the stirring action of the intermittently moving fingers 49 and 51 serves to cause some other clips to fall into proper positions in the grooves.

At its upper portion, the bottom 21 is provided with a pocket 53 over which is carried a tangent extension 56 of the track 55. This extension slopes down to clear fingers 49 and 51 so that in their rotation they may return to the starting point 58 of track 55 (Fig. 1). Each clip that has been caught in grooves 25 and 27, by means of its band 7 and rib 1, straddles the extension 56, and all other clips which are carried up fall off into the pocket 53 and gravitate into the heap C at the base of the sloping bottom 21, ready for another turn at becoming properly positioned in the groove. Arrow A in Fig. 1 shows how properly positioned clips on the extension 56 proceed, and arrow B shows how improperly positioned clips proceed down the pocket 53 to the heap of the clips located at C (Fig. 1).

While the intermittent operation of the arms 47 is desirable, it is not absolutely necessary. However, the intermittent operation tends to prevent the clips from assuming a certain momentum as an integral mass. That is, the fingers 49 and 51 in starting and stopping within the mass of clips tend to mix them more turbulently so that there is a better chance that more will find the proper position in the grooves 25 and 27 (as shown in Fig. 5). It will also be understood that the portions 57 at the ends of arm 47 which straddle 55 and contact with the central bands 7 of the clips tend to sweep the clips along the grooves 25 and 27. The fingers 49 and 51 clear the portion 56 as it traverses the depression 53, because the portion 56 is itself for this purpose.

Figure 3:
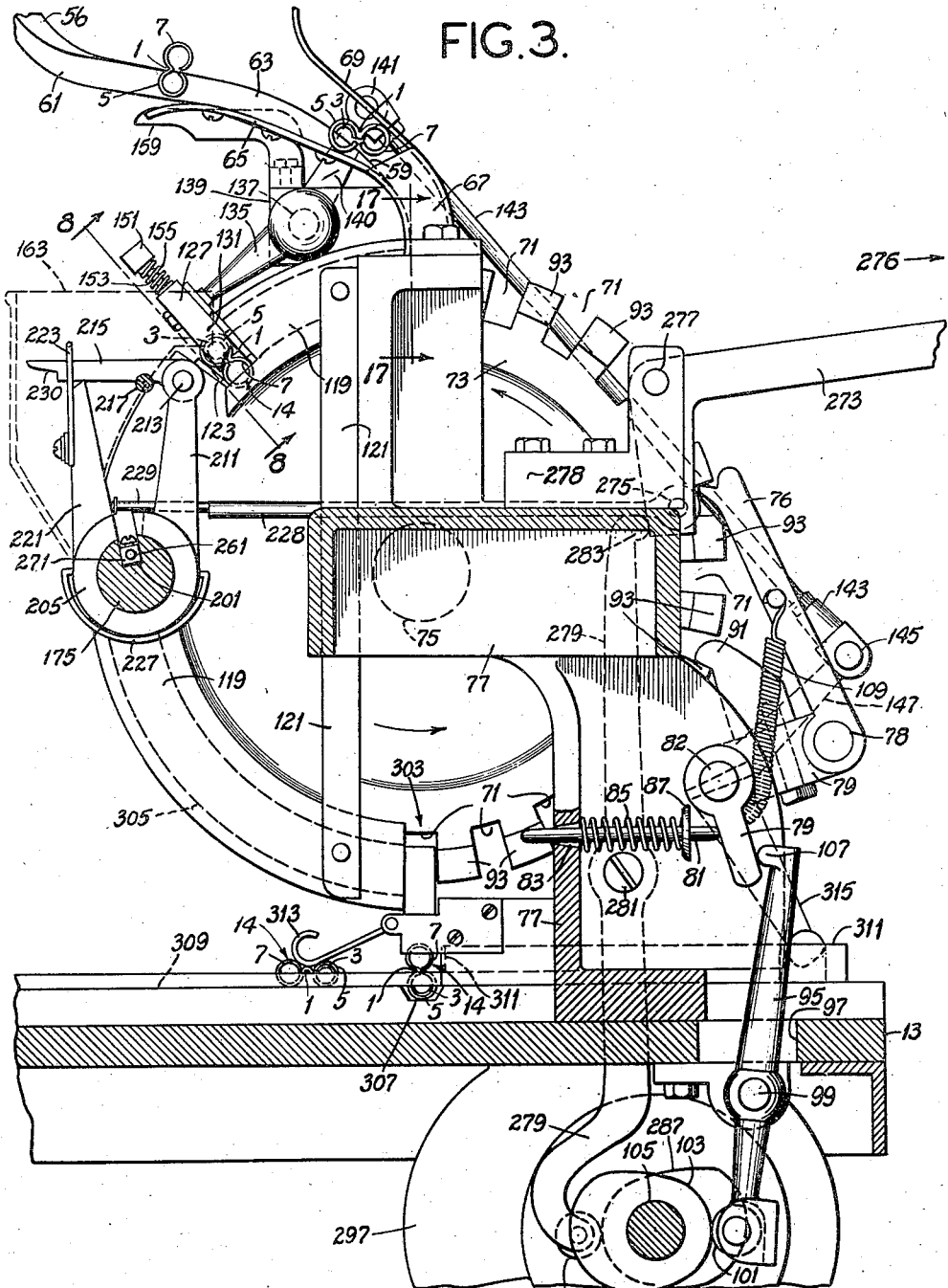
Fig. 3 is an enlarged fragmentary vertical section taken on line 3—3 of Fig. 1.

At a point behind the depression 53, the extension 56 is provided with a bend 61 and a sloping portion 63 (Figs. 2, 3 and 4) adjacent to which is a stationary trip cam 65. At the cam, the portion 63 thins down, as at 59. As the clips approach the cam 65, as shown in Fig. 3, they are tilted forward, so that they enter a tube 67 with the central band portion 7 foremost (Fig. 17). An additional upper guide 69 aids in maintaining the inverted positions of the clips as they vertically enter notches 71 of a dial holder 73. The notches 71 are of the same general cross section as the elevational outlines of the clips (Fig. 17). Each central clip band 7 is inwardly located, whereas the bands 3 and 5 are outwardly directed.

The dial holder 73 is carried on a horizontal shaft 75 supported in a bracket 77, located on the table 13. Substantial friction in the relatively tight bearings for the shaft 75 prevents the dial 73 from freely spinning, but the dial holder may be pushed counterclockwise step by step (compare Figs. 3 and 4).

The dial 73 is pushed forward, one step at a time, by means of a pawl 76 which is pivoted at 78 to a bell crank 79 and biased counterclockwise by a spring 109. The bell crank 79 is keyed to a shaft 82 which has bearings in the frame 77. This bell crank 79 is also biased counterclockwise by means of a bias pin 81 which rocks in a hole 83 and is biased to the right by means of a spring 85 pressing against a shoulder 87. Thus the pin 81 normally biases the bell crank 79 counterclockwise.

Bolted to the bell crank 79 is a stop 91 which, when the bell crank is biased to its maximum counterclockwise position shown in Fig. 3, enters one of the notches 71 and by contact with the teeth 93 between notches 71 holds the dial 73 in a predetermined position.

In order to return the bell crank 79 clockwise, and to release the stop 91 while retracting the pawl 76, there is provided a rocker 95 reaching through an opening 97 of the table top 13 and pivoted thereto at 99. The lower end of this rocker 95 carries a roller 101 riding on a cam 103 which is on a cam shaft 105. When the heel of the cam 103 contacts the roller 101 the locked position of parts is as shown in Fig. 3.

Figure 4:
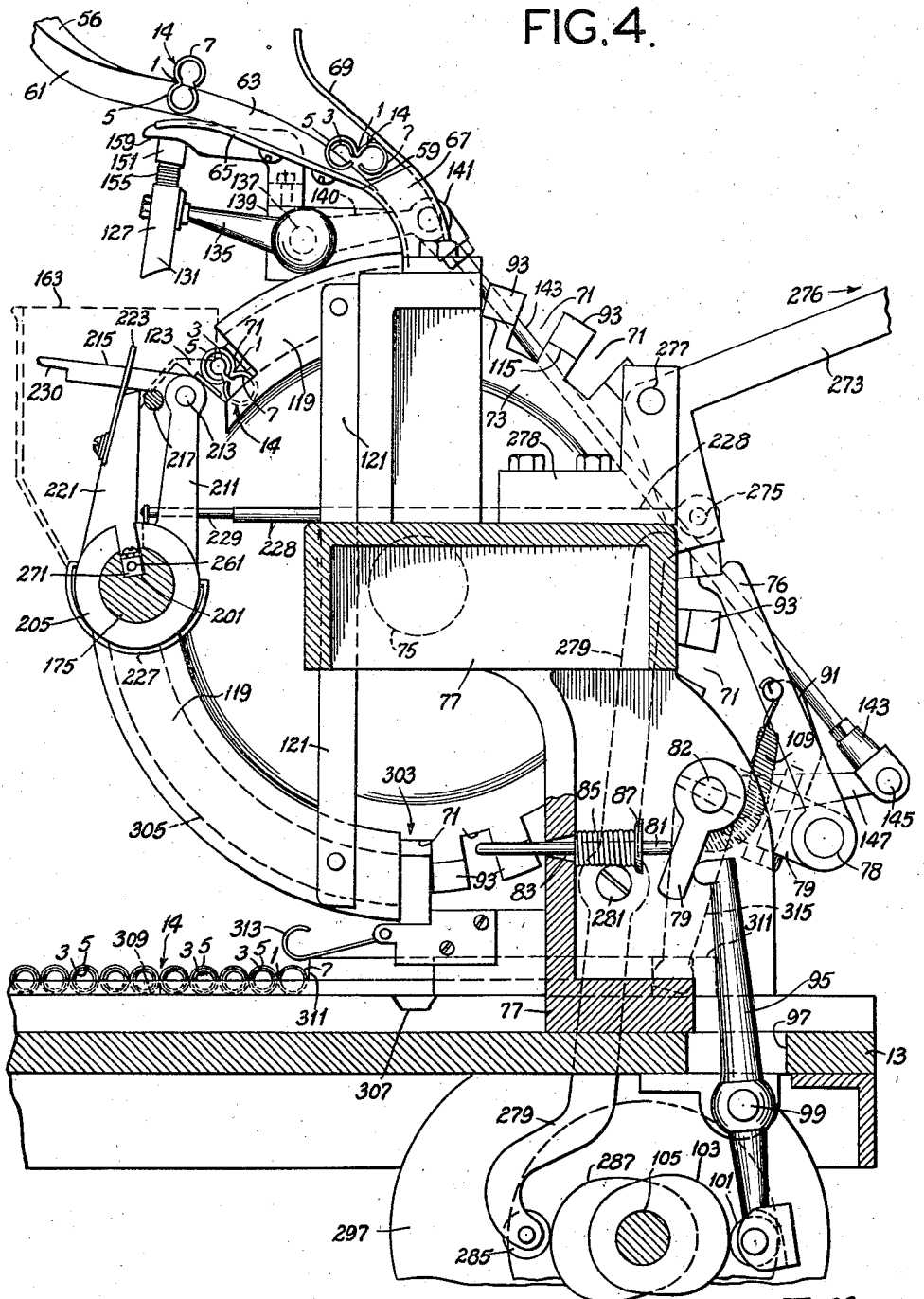
Fig. 4 is a view similar to Fig. 3, but showing changed positions of parts.

When the toe of the cam 103 engages the roller 101, the rocker 95 is moved counterclockwise (Fig. 4). The upper end 107 of the rocker then pushes the bell crank 79 clockwise, against the action of the biasing plunger 81, thus drawing down the pawl 76 which engages in the next notch 71 under action of the biasing spring 109. When the heel of the cam again engages the roller 101, the position of parts of Fig. 3 is again accomplished, wherein expansion of spring 85 has driven the bell crank counterclockwise to push up the pawl 76 and rotate the dial 73 counterclockwise one step between notches 71, while at the same time setting the stop 91 to predetermine the dial position. Thus the successive dial spaces 71 are brought intermittently to what may be called an inserting station 68 below the tube 67 to admit successive clips from the stock in the entry tube 67.

It will be noted from Fig. 17 that the portions 93 between the spaces 71 in the dial 73 are grooved as shown at 111 coincidentally with the space between bands 3 and 5. Also, the outer portions 113 of the members 93 are faced coincidentally with the outer ends of the bands 3 and 5. Also, the dial 73 at its peripheral portions 115 is faced flush with the opposite ends of the band 7. To hold the clips in place in the dial, opposite peripheral casing portions 117 and 119 are provided and supported upon extensions 121 from the brackets 77. These casings 117 and 119 are notched at 123 and at 125 (Figs. 3, 8, 14 and 15), providing what will hereinafter be referred to as two testing stations. That is to say, these notches 123 and 125 provide points at which the intermittently moving clips in the dial 73 are exposed for two tests.

The first test is to gauge for the proper distance between the bands 3 and 5, and this is accomplished by means of an oscillating gauge block 127 (Fig. 8) having a central prong 129 and sidewise prongs 131 providing intermediate spaces 133 with bevels at 134, into which the bands 3 and 5 freely pass when properly spaced. If the bands 3 and 5 are too far apart or too near together, they will, due to friction, stick in the spaces 133. When properly spaced, they will not stick, the spaces 133 being designed for this result.

The gauge block 127 is carried on an arm 135 pivoted on a shaft 137 which is rotary in an extension 139 from one of the members 121. The shaft 137 also carries an arm 140 which is pivoted at 141 to a connecting rod 143. Rod 143 extends down to a connection 145 with an arm 147 also pinned to said shaft 82. Thus the block 127 is operated from the rocker 95. Each time that the bell crank 79 rotates clockwise to release the stop 91 and cause driving of the dial 73, the linkage 147, 143, 140, 137 and 135 is oscillated, first to withdraw the gauge block 127 from the position shown in Fig. 3, to that shown in Fig. 4, and then after movement of the dial 73 to reinsert said gauge block 127 as the dial 73 again comes to rest.

The gauge block 127, as it approaches the final position adjacent to the station 123, is moving substantially radially with respect to the adjacent recess 71 in the dial 73. Thus whenever the dial 73 is stationary, the gauge block 127 is inserted at the station 123 over the clips as indicated in Fig. 8. If the bands 3 and 5 are too far apart or too close together, they stick to the block 127 and are withdrawn when the block moves to the position shown in Fig. 4.

In order to strip a removed clip from the gauge block 127, a stripper 151 is used which has bolts 153 sliding through openings in the block 127. The heads are shown at 161 in the recesses 133. Springs 155 normally bias the stripper into the retracted position shown in Fig. 8, but when the upper surface 157 strikes a stop 159, such as shown in Fig. 4, the heads 161 are driven down relatively into the openings 133 to push out the clip (if present) which drops down into a receiver 163 for rejection.

On the other hand, if the bands 3 and 5 are the correct distance apart, they do not frictionally engage the gauge block 127, and the clip which is therefore left in the dial 73 proceeds, when the dial next moves, forward away from the station 123 (Figs. 3 and 4).

Figure 15:
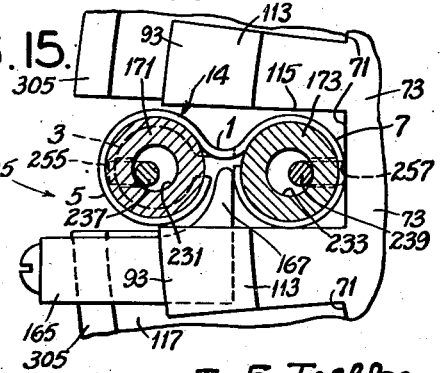
Fig. 15 is a view similar to Fig. 14 but showing changed positions of parts.

Hence, the clip moves intermittently down to the second station 125 where, fastened to the cover 117, is a holding member 165, shown in side elevation in Figs. 14 and 15. This member 165 has a tongue 167 extending in between the bands 3, 5 (taken together) and 7 as they pass in the dial 73. Groove 111 in the dial 73 also accommodates this tongue 167 (Fig. 18). Thus, perfect clips may pass the station 125.

Testing of the clips at station 125 is accomplished by inserting into the openings in the clips, test fingers 171 and 173 (Figs. 12 and 13) which tend to spread apart under a resiliently applied force. If the clip is not strong enough, it may deform it to an extent that the fingers 171 and 173 will withdraw it sidewise through the opening 125 to abstract the clip from the dial 73. If the clip is strong enough it will resist the resiliently applied force and prevent spreading of the fingers 171 and 173 and will therefore not be withdrawn. The details of the pertinent structure are shown primarily in Figs. 1, 2, 3, 4 and 10–15.

Said Figs. 1, 2, 3, 4 and 10–15 show a reciprocating ram 175 in bearings 177 on an extension 179 from the frame bracket 77. This ram 175 is slotted at 181 wherein is the head 183 of an oscillating arm 185 carried on a vertical shaft 187. At its bottom end, the shaft 187 carries an arm 189 with a conical roller follower 191 engaging a cam 193 on said cam shaft 105 (see also Fig. 9). The vertical shaft 187 is returned by a spring 195 reacting between a collar 197 on the shaft 187 and a bolt 199 fixed with respect to the table 13. The bias of the spring 195 is such as normally to force the follower 191 against the cam 193 and therefore to force the ram to the left in Fig. 1. This forces the test fingers 171 and 173 toward station 125.

Figure 10:
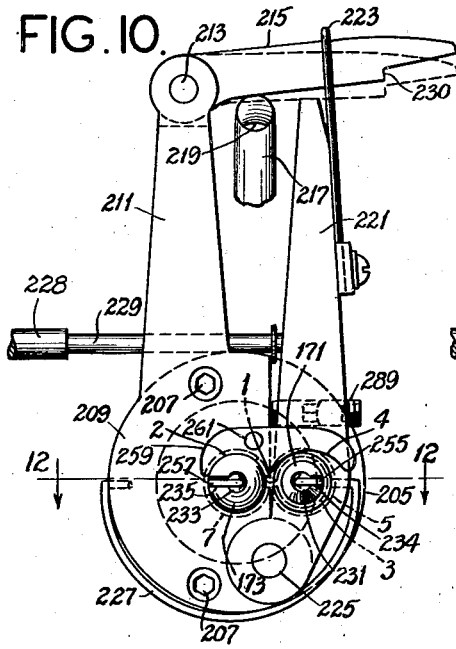
Fig. 10 is an enlarged vertical section taken on line 10—10 of Fig. 1.

The left end of the ram 175 is slotted as shown at 201 and is held vertical by means of a stop 203 in the slot 201. Farther to the left, the ram 175 is provided with a head 205. Viewing this head 205 from the end as in Figs. 10 and 11, it will be seen to have fastened thereto by fasteners 207 a cap 209. Extending up from the cap 209 is a rigid vertical arm 211, the upper end of which is bifurcated and has pinned at 213 a latch 215. This latch is retracted and rests upon a stationary cam 217 when the ram 175 is drawn to the right, as viewed in Fig. 2, and as shown in Fig. 10. To facilitate movement of the latch 215 onto the cam 217, the cam is beveled as shown at 219. This cam 217 is fixed to the rigid extension 179. The lift of the latch 215 by the cam 217 is limited by a bale wire 223 swinging on an oscillating arm 221. When the ram is to the left, as viewed in Fig. 2, the latch 215 leaves the cam 217 and rests upon the end of the oscillating arm 221 (see the dotted lines in Fig. 10).

Figure 11:
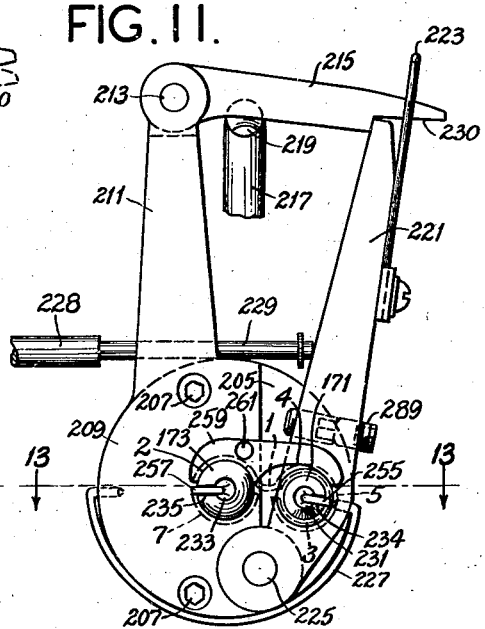
Fig. 11 is a view similar to Fig. 10 but showing different positions of parts.

The arm 221 is pivoted to the head 209 at 225 and is normally biased toward the arm 211 by means of a semicircular spring 227. It is pushed away from arm 211 by means of a plunger 229 born in 211, which operates from the position shown in Fig. 10 toward the position shown in Fig. 11 to accomplish separation of arms 211 and 221. If the separation is great enough, the latch 215 has its notched end 230 drop in behind the end of the arm 221 so that the return of the arm 221 is temporarily prevented (see Fig. 11). However, if the arm 221 does not swing out as far as shown in Fig. 11, then the latch 215 is not operative and the arm 221 may return toward the arm 211 under action of the spring 227 when the plunger 229 recedes, as indicated in Figs. 3 and 4.

The motion of the movable arm 221 toward the fixed arm 211 under action of the spring 227 is limited by means of an adjustable stop 289.

The head 209 carries the finger 173 already mentioned, and the arm 221 carries the finger 171. These fingers 173, 171, when positioned adjacent to one another as shown in Fig. 10, are adapted respectively to enter the bands 1 and 3, 5 (taken together), while a clip is in the dial 73 at the station 125. This occurs when the ram 175 moves to the left, and when the arms 211 and 221 are sprung together by 227, as shown in Fig. 10. After the fingers 173 and 171 have entered the clip in the dial at station 125, the spreading action of the plunger 229 tends to spread the clip as shown in Figs. 3 and 11.

Figure 12:
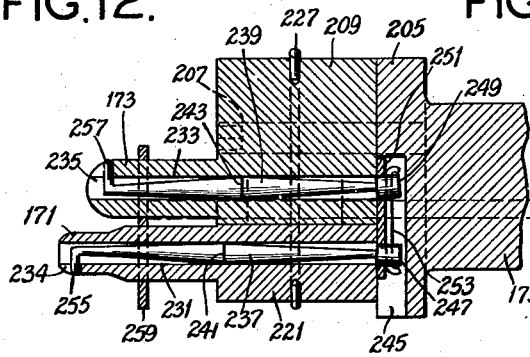
Fig. 12 is a horizontal section taken on line 12—12 of Fig. 10.
Figure 13:
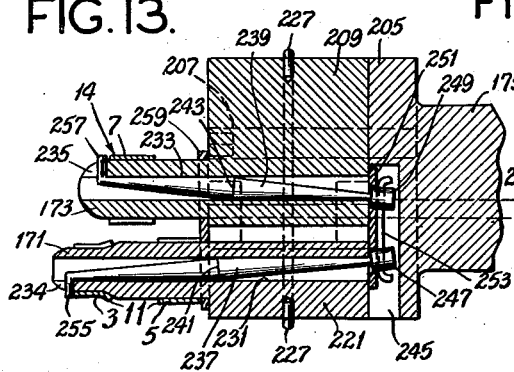
Fig. 13 is a horizontal section taken on line 13—13 of Fig. 11.

In Figs. 12 and 13 it is shown that the fingers 171 and 173 are hollow, as indicated at 231 and 233. At the ends, the hollow tubular portions open out sidewise, as indicated at 234 and 235. Conical pins 237 and 239, having central rocking edges 241 and 243, rock in the openings 231 and 233.

At their rear portions these pins are provided with heads 247 and 249 joined by a drag link 251 which is prevented from coming off by a locking wire 253. At the other ends, the pins 237 and 239 are provided with catches 255 and 257. When the arm 221 rocks away from the arm 211, the holding action of the drag link 251 causes the pins 237 and 239 to rock so that the catches 255 and 257 move outward to hold any clip which may be on the fingers (see Figs. 11, 13 and 15). At the same time the fingers 171 and 173 are separated.

In order to remove a clip from the fingers 171 and 173 when the catches 255 and 257 are in the receded position of Fig. 12, a sliding stripper 259 is provided which slides on the tops of the fingers 171 and 173 and which has a stem 261 slidably passing through the member 209 and head 205, into the groove 201, where it is provided with a collar 271 engageable with the stop 203 when the ram 175 is retracted (Figs. 1, 2, 10-13).

Stripper 259 has two arc shapes 2 and 4. The arc shape 2 fits the fixed finger 173, whereas the arc 4 is above the laterally movable finger 171 and is flat so as to permit lateral movement of the finger (compare Figs. 10 and 11).

The pusher 229 is biased to the left (Figs. 3 and 4), which is to say to the right in Figs. 10 and 11. When the head 209 has advanced to its extreme lefthand position (Fig. 1), the pusher 229 is opposite a push rod 228. The push rod 228 is pinned to a bell crank 273 at 275, and by reciprocation drives the pusher 229 when the latter is opposite rod 228. The bell crank is pinned at 277 to an extension 278 from the frame 77. This bell crank 273 is adjustably weighted as shown at 276.

The bias of the bell crank 273 on the pusher 229 is intermittently cancelled by means of a rocker 279 pivoted to the frame at 281. The upper end of the rocker 279 contacts the lower end of the bell crank 273 by means of the end 283 of the rocker. The lower end of the rocker carries a roller 285 which engages a cam 287 on the cam shaft 105. Thus intermittently the bell crank is rotated clockwise to withdraw the push rod 228 which permits return of 229. Otherwise, clockwise rotation of the bell crank 273 under action of the weight 276 biases the push rod 228 and member 229 toward the arm 221 so that the latter is biased away from the fixed stationary arm 211 against spring 227. The spring 227 is not strong enough to push back the arm 221 against the bias on the plunger 229, that is, against the effect of the weight 276 on the bell crank 273. But the relieving action of the rocker 279 in pushing the bell crank 273 counterclockwise and raising the weight 276 is what takes the load off the spring 227, so that return action of the arm 221 may take place under force from spring 227 after latch 215 has contacted cam 217 to release arm 221 (see Fig. 10). Then the stripper 259 strips the clip off from the adjacently located fingers 171, 173 while catches 255 and 257 are retracted (Fig. 12). The link 251 is stiff enough so that when the fingers 171 and 173 reapproach, the right ends of the rockers 237 and 239 are held apart so that the catches 255 and 257 are retracted as shown in Fig. 12.

Any clips that are stripped from the fingers 171 and 173 by the stripper 259 drop into a receiver 291 from which they are directed to discard.

The entire machine is driven from a belt 293 operating a step pulley 295, which through a gear reduction box 297 drives the cam shaft 105. A belt drive 299 from a cam shaft 105 to the countershaft 39 effects driving of the bevel gear 35. The cam shaft 105 is carried in bearings 301.

Operation of the complete device is as follows:

Drive is effected through the belt 293, pulley 295, gear box 297, and to the cam shaft 105. The drive 299 causes continuous rotation of countershaft 39 and the beveled pinion 37. By reason of the absence of teeth on said pinion, the beveled gear 35 is intermittently driven and thus also the spider 28.

A supply C of clips dumped into the container 19 is thus intermittently stirred and sooner or later a substantial number of clips will find their way into the position shown at the lower end of Fig. 5. Such clips are pushed around on the track 55, and many that are in improper position drop off at the part 56 of the track that crosses the pocket 53 and return to the supply C to be further stirred for becoming properly positioned. Such clips as properly straddle the track 55 continue on around 56 to the curve 61, where the lower bands 3, 5 strike the cam 65 so that the intermediate band 7 becomes tilted forward. Therefore as the clip enters the tube 67 it is inverted and directed into a space 71 in the dial 73 with the band 7 inward and the bands 3 and 5 outward (Figs. 8, 17 and 18).

At the time that a clip enters the dial 73, the dial is stationary. Then the dial is driven forward one step by the action of cam 103 on the roller 101 at the bottom of the rocker 95. The top 107 of the rocker pushes the bell crank 78 to draw down the pawl 76. The pawl 76 drops into the next space 71 on the dial as the rocker 95 returns, whereupon the spring 85 pushes the bell crank 79 counterclockwise, so that the pawl 76 drives the dial 73 one space forward. Subsequently the stop 91 determines the exact final position of the dial 73.

Meanwhile, another clip in the dial 73 has proceeded to the first test station 123, toward which, after the dial has become stationary, the gauge block 127 swings on arm 135. If the clip at station 123 has the outwardly directed bands 3 and 5 improperly spaced, they will stick in the gauge block 127 and be abstracted. Then when the gauge block swings up and the surface 157 of the stripper 151 strikes stop 159, this abstracted clip will be stripped from the block 127 and drop into the discard chute 163.

Meanwhile, another clip which has passed the first test at station 123 has arrived at the station 125, opposite the lateral reciprocating fingers 171 and 173. The condition of the clip as it arrives at the station 125 is shown in Fig. 14. The tongue 167 in Figs. 14 and 18 at this time precludes withdrawal of the clip sidewise toward the viewer in Fig. 14. This is because there is not space enough at the junction waist between the circular parts of the figure 8 form of the clip, to permit passage of the clip sidewise. Thus it cannot be abstracted. As the dial comes to rest, the plunger 175 is driven to the left to plunge fingers 171 and 173 sidewise into the bands 3, 5 (taken together) and 7 respectively.

As the fingers enter the clip the stripper 259 is driven back relatively upon the fingers, as shown in Fig. 13 by contact with the clip. As the fingers are driven into the clip, the latch 215 drops from the stationary cam 217 into the position shown in Fig. 3 and the dotted line position shown in Fig. 10. Then when the fingers are firmly seated in the clip, the end 283 of the rocker 279 recedes to allow the weight 276 on the bell crank 273 to force the members 228 and 229 against the arm 221 to spread it away from the arm 211, as indicated in Fig. 3. The weight is predetermined so that a clip of proper strength will not stretch too far. In other words, this is a predetermined resilient stretching bias on the clip. Thus, if the clip is strong enough, the movement of arm 221 is not great enough to cause the latch 215 to drop in behind the arm 221, and subsequently arms 221 and 211 again come together because of the spring 227 and resilience in the clip. This occurs upon retraction of the pusher 228 under action of the cam 287, rocker 279 and bell crank 273, operating against the weight 276. Thereafter the plunger 175 is drawn back by the action of cam 193 on follower 191 and vertical shaft 187. It will be noted that in driving the fingers 171 and 173 into the clip it is the spring 195 that provides the force. In other words, this is again resilient application of a force. Any proper clip is thus retained at station 125 since the lip 167 is engaged by the non-deformed clip (after test) to hold it, or strip it, from the fingers 171, 173. It is clear that, although the catches 255 and 257 did spread to holding positions as the fingers 171 and 173 spread, the catches returned to releasing position upon return of these fingers. Thus the fingers 171, 173 may be retracted without withdrawing any proper clip.

Next, let it be assumed that a weak clip reaches the station 125. Under these conditions, the fingers 171 and 173 are driven into the clip, as already explained. Thereafter, the members 229 and 228 push the arm 221 away from the arm 211 with predetermined force, and since the clip is too weak, it spreads too far, as shown in Figs. 11 and 15. It spreads so far that not only do the lips 255 and 257 come out definitely to hold the clip on the spread fingers 171 and 173, but also that clearance is provided between the clip (below its waist or rib 1) and the lip 167 (Fig. 15). Also, the spread is so far that the latch 215 falls in behind the upper end of the separated arm 221, so that even when the pusher 229 is retracted the position of parts shown in Figs. 11, 13 and 15 will be maintained against the tension of the spring 227 and of the clip. Thus upon initial withdrawal movement by the plunger 175, the clip is withdrawn from the respective opening 71 of the dial 73 at the station 125. As withdrawal is completed, the latch 215 strikes the stationary cam 217 which permits spring 227 to force back the movable arm 221 in the absence of the plunger 229 which at this stage has been withdrawn. Then the shoulder 271 on stem 261 of the stripper 259 strikes the stationary lug 203. This relatively moves the stripper to the position shown in Fig. 12 to strip the clip from the fingers 171 and 173 to drop it into the rejection chute 291.

From the above, it will be seen that any clip which under the force predetermined by the weight 276 stretches too much is automatically withdrawn and rejected. If a clip breaks, the action will be the same as above and both pieces will be removed.

If a (good) clip is not withdrawn at the station 125, it subsequently moves intermittently from that station to a third station 303, being held in place as it is inverted by inwardly directed flanges 305 (Fig. 18) of the members 117 and 119. Finally, it clears the ends of the members 117, 119 and 305 (Figs. 3 and 4) and drops down in a recess 307 below a groove 309. A plunger 311 reciprocates in connection with the groove 309 to drive the clips forward horizontally under an outlet gate 313. The plunger 311 is reciprocated by an arm 315 carried on said countershaft 82.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. In apparatus of the class described, a track adapted to be straddled by a cartridge clip having a pair of spaced depending bands riding on opposite sides of the track and a connected intermediate band riding above the track, said last-named band being directed upward by the gravity effect of said depending bands, said track permitting sliding of the straddled clip, an indexing dial having radial openings for receiving the clip, a chute adapted to receive the clip to insert it radially into one opening of the dial, said track being curved where it enters the chute, and a cam adjacent said curve for contacting the depending bands to turn them rearwardly, whereby the upper band portion tips forward as it advances into said chute to be directed radially inward in said dial, said spaced bands on the clip being then directed outward in said dial.

2. In apparatus of the class described, an intermittently movable indexing dial having outwardly directed radial openings for receiving clips, means adapted to insert clips radially from the outside of the dial into the openings, each clip having spaced bands directed outward from the dial and an intermediate band directed inward, and means radially movable toward and away from the dial when it is stationary to frictionally engage between said outwardly directed bands if they are improperly spaced to remove a clip radially outward from the dial.

3. In apparatus of the class described, an intermittently movable indexing dial having radial openings for receiving clips, means adapted to insert clips radially into the openings of the dial, each clip having spaced bands directed outward from the dial and an intermediate band directed inward, means radially movable toward and away from the dial when it is stationary to frictionally engage said bands if they are improperly spaced to remove a clip from the dial, finger means movable laterally of the dial for subsequent insertion into said bands, and means for temporarily spreading said fingers under predetermined force and for withdrawing the clip from the dial if it spreads too far but otherwise to leave the clip in the dial.

4. Automatic clip gauging means comprising a movable member having clip receiving recesses, a gauge block, means for intermittently moving said gauge block to and away from said moving means at a point adjacent a clip, said gauge block being adapted to be frictionally engaged by the clip if the clip is of improper shape, to withdraw the clip from the movable member, stripper means carried by the gauge block, means normally retracting said stripper means from stripping position, and a fixed means engageable by said stripper means to enforce disengagement of the clip from the gauge block upon retraction of the block from said movable member.

5. Automatic clip gauging means comprising an intermittently movable member having clip receiving recesses, a testing member, means for intermittently moving said testing member to and away from said movable member at a point adjacent a clip, said testing member being adapted to be engaged by the clip if the clip is of improper size to withdraw the clip from the movable member, stripper means carried by the testing member, means normally retracting said stripper means, and a fixed means engageable by said stripper means to enforce disengagement of the clip from the testing member upon retraction of the testing member from said movable member.

6. Gauging apparatus for clips and the like comprising a rotary indexing dial, clip receiving recesses at the edge of said dial, a gauge block adapted to move toward and away from the dial substantially radially at a clip containing recess, said block being frictionally engageable with improperly sized clips to withdraw them from the dial, a stop, and stripper means carried with and by the gauge block adapted automatically to remove from the gauge block a clip which has been withdrawn from the dial, operation of the stripper being caused by relative movement when the receding movement of said gauge block is toward said stop.

7. Apparatus for testing clips having bands related sidewise as a figure eight, comprising means for intermittently moving the clips into a stationary position at a withdrawal station, a tongue normally preventing withdrawal of a clip from the station when the clip is undeformed but permitting said withdrawal when adjacent loops of the figure eight are separated too far, means for inserting adjacent fingers into said loops, resilient tensioning means biasing said fingers apart, means causing return of said fingers only if the clip has deformed less than a certain amount, said fingers otherwise being locked apart to spring said loops of the clip to clear said tongue, and means for moving said fingers axially when locked apart to pull out the clip.

8. Apparatus for testing clips having loops related sidewise as a figure eight, comprising means for intermittently moving the clips into a stationary position adjacent to a withdrawal station, a tongue extending between the loops normally preventing withdrawal of a clip from the station when the clip is undeformed but permitting said withdrawal when the adjacent loops of the figure eight are separated too far, means for inserting adjacent fingers into adjacent loops of the clip, resilient tensioning means of predetermined force intermittently biasing said fingers apart, means causing return of said fingers only if the clip has deformed less than a certain amount, said fingers otherwise being blocked apart to spring said clip to clear said tongue, means for withdrawing said fingers to pull out the clip, and means for tripping the blocking means to effect return together of said fingers after said withdrawal.

9. Apparatus for testing clips having bands related sidewise as a figure eight, comprising means for intermittently moving the clips into a stationary position at a withdrawal station, a tongue normally preventing withdrawal of the clip at the station when it is undeformed but permitting said withdrawal when the adjacent loops of the figure eight are separated too far, means for inserting adjacent fingers into said loops of the clip, resilient tensioning means biasing said fingers apart, means causing return of said fingers only if the clip has deformed less than a certain amount, said fingers otherwise being blocked apart to spring said clip to clear said tongue, means for withdrawing said fingers to pull out the clip, and catches automatically operable upon separation between the fingers to effect a positive interlock with the clip for withdrawal.

10. Apparatus for testing clips having three bands related sidewise as a figure eight and two of which are spaced in plan, comprising an intermittently moving dial having clip receiving recesses, a gauge block, means for intermittently moving said gauge block to and away from said dial at a first station adjacent a clip, said gauge block being adapted to be frictionally engaged by the clip if the two loops of the clip are of improper spacing in plan to withdraw the clip radially from the dial, means for intermittently moving the clips into a stationary position adjacent to a second station, a tongue normally preventing withdrawal of the clip at the station when it is undeformed but permitting said withdrawal when the adjacent loops of the figure eight are separated too far, means for inserting adjacent fingers into adjacent loops of the clip, resilient tensioning means biasing said fingers apart, means causing return of said fingers only if the clip has deformed less than a certain amount, said fingers otherwise being blocked apart to spring said clip to clear said tongue, and means for withdrawing said fingers to pull out the clip.

11. Apparatus for testing clips having three bands related sidewise as a figure eight and two of which are spaced in plan, comprising an intermittently moving dial having clip receiving recesses, a gauge block, means for intermittently moving said gauge block to and away from said dial at a first station adjacent a clip, said gauge block being adapted to be frictionally engaged by the clip if the two loops of the clip are of improper spacing in plan to withdraw the clip radially from the dial, stripper means carried by the gauge block, means normally retracting said stripper means, and a fixed means engageable by said stripper means to enforce disengagement of the clip from the gauge block upon retraction of the block from said dial, means for intermittently moving the clips into a stationary position adjacent to a second station, a tongue normally preventing withdrawal of the clip at the station when it is undeformed but permitting said withdrawal when the adjacent loops of the figure eight are separated too far, means for inserting adjacent fingers into adjacent loops of the clip, resilient tensioning means biasing said fingers apart, means causing return of said fingers only if the clip has deformed less than a certain amount, said fingers otherwise being blocked apart to spring said clip to clear said tongue, means for withdrawing said fingers to pull out the clip, and catches at the ends of the fingers automatically operable upon too great a separation between the fingers to form a positive interlock with the clip for its removal.

12. Apparatus for testing clips having three bands related sidewise as a figure eight and two of which are spaced in plan, comprising an intermittently moving dial having clip receiving recesses, a gauge block, means for intermittently moving said gauge block to and away from said dial at a first station adjacent a clip, said gauge block being adapted to be frictionally engaged by the clip if the two loops of the clip are of improper spacing in plan to withdraw the clip radially from the dial, stripper means carried by the gauge block, means normally retracting said stripper means, and a fixed means engageable by said stripper means to enforce disengagement of the clip from the gauge block upon retraction of the block from said dial, means for intermittently moving the clips into a stationary position adjacent to a second station, a tongue normally preventing withdrawal of the clip at the station when it is undeformed but permitting said withdrawal when the adjacent loops of the figure eight are separated too far, means for inserting adjacent fingers into adjacent loops of the clip, resilient tensioning means biasing said fingers apart, means causing return of said fingers only if the clip has deformed less than a certain amount, said fingers otherwise being blocked apart to spring said clip to clear said tongue, means for withdrawing said fingers to pull out the clip, catches at the ends of the fingers automatically operable upon too great a separation between the fingers to form a positive interlock with the clip for its removal, means for withdrawing said catches after said removal, and means for stripping the clip from said fingers.

13. Apparatus for testing clips having loops related sidewise as a figure eight, comprising means for intermittently moving the clips into a stationary position adjacent to a station for sidewise withdrawal, a tongue normally preventing withdrawal of the clip at the station when it is undeformed but permitting said withdrawal when the adjacent loops of the figure eight are separated too far, means for inserting adjacent fingers into said loops of the clip when adjacent, resilient tensioning means biasing said fingers apart, means for returning said fingers only if the clip has deformed less than a certain amount, said fingers otherwise being blocked apart to spring said clip to clear said tongue, means for withdrawing said fingers sidewise to pull out the clip, catches at the ends of the fingers automatically operable upon too great a separation between the fingers to form a positive interlocking engagement with the clip for withdrawal, and means to bring said fingers together after withdrawal of the clip and to retract said positive catch means.

14. Apparatus for testing clips having bands related sidewise as a figure eight, comprising means for intermittently moving the clips into a stationary position adjacent to a withdrawal station, a tongue normally preventing sidewise withdrawal of the clip at the station when it is undeformed but permitting said sidewise withdrawal when the adjacent bands of the figure eight are separated too far, means for inserting adjacent fingers into the bands of the clip when adjacent, resilient tensioning means of predetermined force biasing said fingers apart, means for returning said fingers only if the clip has deformed less than a certain amount, said fingers otherwise being held apart to spring said clip to clear said tongue, means for withdrawing said fingers to pull out the clip, catches at the ends of the fingers automatically operable upon too great a separation between the fingers to form a positive interlocking engagement with the clip for sidewise withdrawal, means to bring said fingers together after withdrawal of the clip and to retract said positive catch means, and a stripper relatively movable to strip the clip from the fingers.

15. A reciprocating head for abstracting double looped clips of figure eight shape, comprising a laterally immovable finger for insertion into one loop of a clip, a second laterally movable finger for simultaneous insertion into the other loop of the clip, a rocking lever supporting said second finger, means biasing said rocking lever to bias the movable finger away from the immovable finger, a latch automatically operable to hold the rocking lever so that the movable finger cannot return to the fixed finger once it has moved too far away, and means biasing the movable finger back toward the fixed finger against the action of said latch.

16. A reciprocating head for abstracting double looped clips of figure eight shape, comprising a laterally immovable finger for insertion into one loop of a clip, a second laterally movable finger for simultaneous insertion into the other loop of the clip, a rocking lever supporting said second finger, means biasing said rocking lever to bias the movable finger away from the immovable finger, a latch automatically operable to hold the rocking lever so that the movable finger cannot return to the fixed finger once it has moved too far away, means biasing the movable finger back toward the fixed finger against the action of said latch, and cam means for releasing the latch when said head is retracted during reciprocation.

17. A reciprocating head for abstracting double looped clips of figure eight shape comprising a laterally immovable finger for insertion into one loop of a clip, a second laterally movable finger for simultaneous insertion into the other loop of the clip, a rocking lever supporting said second finger, means biasing said rocking lever to bias the movable finger away from the immovable finger, a latch automatically operable to hold the rocking lever so that the movable finger cannot return to the fixed finger once it has moved too far away, means biasing the movable finger back toward the fixed finger against the action of said latch, cam means for releasing the latch when said head is retracted, and positive catch means associated with said fingers operable to catch a clip surrounding the fingers only when the movable finger has separated from the fixed finger.

18. Clip extracting apparatus comprising two adjacent fingers, one of said fingers being laterally fixed and the other being laterally moved away from and to said fixed finger, positive catches movable laterally from the ends of said fingers comprising rockers in hollow portions of said fingers, said catches being movable into extended and retracted positions from the ends of the fingers, and a drag link connecting the ends of said rockers opposite the catches whereby when said fingers separate, the drag link causes the rocker to rock relatively in directions to force said catches from one another and from the ends of said relatively moving fingers.

19. Clip extracting apparatus comprising two fingers, one of said fingers being laterally fixed and the other being laterally moved away from and to said fixed finger, catches movable laterally from the ends of said fingers comprising rocker members in hollow portions of said fingers, said catches being movable into extended and retracted positions, and a drag link connecting the ends of said rockers opposite the catches, whereby when said fingers separate the drag link causes the rocker to rock relatively in directions to force said catches from one another and from the ends of said relatively moving fingers, said drag link being rigid enough to cause retraction of said hooks when the fingers reapproach.

20. In a clip tester, an intermittently rotary indexing dial having openings for receiving clips to be tested, the clips presenting openings axially of the dial, a reciprocating head movable parallel to the dial axis, test fingers on said head relatively movable laterally, means normally laterally biasing said fingers togther, means for applying a predetermined force biasing said fingers apart, and intermittent means for preventing operation of said means for biasing the fingers apart except when said fingers are moved axially to testing position.

21. In a clip tester, a reciprocating head, test fingers on said head relatively movable laterally, means normally laterally biasing said fingers together, means for applying a predetermined force biasing said fingers apart, and intermittent means for preventing operation of said means for biasing the fingers apart except when said fingers are moved axially to testing position, and means for positively holding said fingers apart even after said biasing force is removed whenever a clip permits excessive separation of the fingers therein.

22. In a clip tester, a reciprocating head, test fingers on said head relatively movable laterally, means normally biasing said fingers together, means for applying a predetermined force biasing said fingers apart, intermittent means for preventing operation of said means for biasing the fingers apart execpt when said fingers are moved axially to testing position, means for positively holding said fingers apart when said bias force is removed whenever a clip permits excessive separation of the fingers therein, and means effective upon withdrawal of said head to release said positive holding means.

23. In a clip tester, a reciprocating head, test fingers on said head relatively movable laterally, means normally biasing said fingers together, means for applying a predetermined force biasing said fingers apart, and intermittent means for preventing operation of said means for biasing the fingers apart except when said fingers are moved axially to testing position, means for positively holding said fingers apart when said bias force is removed whenever a clip permits excessive separation of the fingers therein, means effective upon withdrawal of said head to release said positive holding means, and stripping means relatively movable upon said withdrawal of said head to move a clip from said fingers.

24. A tester for clips which are double banded on one side and double looped in elevation, comprising an intermittently movable member having clip receiving recesses, the successive clip recesses moving successively past two stations, said movable member at the stations presenting the double bands of the clip outward and the double loops sidewards, a gauge block movable to and away from the movable member at the first station and into juxtaposition with a clip therein and having frictional engagement with improperly spaced bands so as to pick the clips from the movable member, spaced reciprocating fingers movable to and from said movable member at the second station to be inserted into a clip at said second station, means for resiliently forcing said fingers apart while in the clip at said second station, means for maintaining the clip in engagement with said fingers should it deform excessively whereby the clip is withdrawn from said movable member, and means for removing the clip from said fingers upon withdrawal and returning said fingers to adjacent positions for insertion into the next successive clip.

25. Means for testing for deformation of clips having double loops joined at a waist, comprising an intermittently movable member having recesses for receiving clips and successively bringing the clips into stationary position adjacent to a testing station, reciprocating fingers adapted to be inserted into and withdrawn from said loops, means for biasing said fingers apart laterally under a predetermined force to separate said loops, means for relieving said biasing force before the fingers are withdrawn from the loops, a finger between the loops at the waist and adapted to strip the loops from the fingers when the loops are normally related but to clear between the loops in abnormal separated positions so that the clip may be withdrawn.

26. Means for testing for deformation of clips having double loops joined at a waist, comprising an intermittently movable member having recesses for receiving clips and successively bringing the clips into stationary position adjacent to a testing station, reciprocating fingers adapted to be inserted into and withdrawn from said loops, means for biasing said fingers apart laterally under a predetermined force to separate said loops, means for relieving said biasing force before the fingers are withdrawn from the loops, a finger between the loops at the waist and adapted to strip the loops from the fingers when the loops are in their normal position but to clear between the loops in abnormal separated positions of the same, and means associated with said fingers for positively withdrawing the clip from the movable member when the clip is in excessively stretched position.

27. Means for testing for deformation of clips having double loops joined at a waist, comprising an intermittently movable member having recesses for receiving clips and successively bringing the clips into stationary position adjacent to a testing station, reciprocating fingers adapted to be inserted into and withdrawn from said loops, means for biasing said fingers apart laterally under a predetermined force to separate said loops, means for relieving said biasing force before the fingers are withdrawn from the loops, a finger between the loops at the waist and adapted to strip the loops from the fingers when the loops are in their normal position but to clear between the loops in abnormal separated positions of the same, means associated with said fingers for positively withdrawing the clip from the movable member when the clip is in obnormally stretched position, and means for maintaining said fingers in relatively separated positions as they are withdrawn whenever a loop into which they are inserted stretches beyond a certain limit.

AUGUST F. TOELKE.
PETER J. WENTA.